United States Patent [19]

Meinhold et al.

[11] 4,443,524
[45] Apr. 17, 1984

[54] HIGH-TEMPERATURE BATTERY

[75] Inventors: Henner Meinhold, Sandhausen; Dieter Hasenauer, Weinheim, both of Fed. Rep. of Germany

[73] Assignee: Brown, Boveri & Cie AG, Mannheim, Fed. Rep. of Germany

[21] Appl. No.: 375,967

[22] Filed: May 7, 1982

[30] Foreign Application Priority Data

May 15, 1981 [DE] Fed. Rep. of Germany ....... 3119409

[51] Int. Cl.³ .............................................. H01M 2/10
[52] U.S. Cl. ...................................... 429/99; 429/120
[58] Field of Search ...................... 429/99, 26, 120, 96

[56] References Cited

U.S. PATENT DOCUMENTS

| | | | |
|---|---|---|---|
| 3,745,048 | 7/1973 | Dinkler et al. | 429/120 |
| 3,837,918 | 9/1974 | Nakobayashi | 429/120 X |
| 4,097,654 | 6/1978 | Guazzoni | 429/99 X |
| 4,107,402 | 8/1978 | Dougherty et al. | 429/120 |
| 4,215,307 | 7/1980 | Windisch et al. | 429/120 X |
| 4,262,064 | 4/1981 | Nagle | 429/120 X |
| 4,314,008 | 2/1982 | Blake | 429/120 X |
| 4,317,497 | 3/1982 | Alt et al. | 429/99 X |
| 4,324,844 | 4/1982 | Kothmann | 429/120 X |
| 4,342,816 | 8/1982 | Kothmann et al. | 429/120 X |
| 4,383,013 | 5/1983 | Bindin et al. | 429/120 X |

Primary Examiner—Charles F. LeFevour
Attorney, Agent, or Firm—Herbert L. Lerner; Laurence A. Greenberg

[57] ABSTRACT

High-temperature battery with at least one electro-chemical storage cell which is surrounded by thermal insulation as well as by feed and discharge lines for the cooling air. At least one module which can be inserted into the high-temperature battery, contains the storage cells. The module has a feedline for cooling air and a discharge for the cooling air which are arranged so that the cooling air can be introduced into the module against the force of gravity and discharged from the module with the force of gravity.

9 Claims, 3 Drawing Figures

HIGH-TEMPERATURE BATTERY

BACKGROUND OF THE INVENTION

1. Field of the Invention

The invention relates to a high-temperature battery with at least one electrochemical storage cell which is surrounded by thermal insulation as well with feed and discharge lines for the cooling air.

2. Description of the Prior Art

Such high-temperature batteries which are constructed from electrochemical storage cells will be used increasingly in the future for the electric propulsion of vehicles.

The high-temperature batteries that have become known to date are constructed from a multiplicity of electrochemical storage cells. The battery operates at a temperature of about 350° C. In order to avoid heat losses, the storage cells of the high-temperature battery are surrounded by thermal insulation. On the other hand, however, care must be taken that sufficient cooling within this battery is provided so that the operating temperature of the battery is not exceeded, and damage to the storage cells cannot come about.

A rechargeable high-temperature storage battery is known from German Published Non-Prosecuted Application DE-OS 26 45 261. This storage battery is surrounded by a housing which has an adjacent insulating jacket surrounding the entire storage battery, leaving a space free in between. Outside air can be introduced into the space for heating or cooling. The air can leave the interspace again at an oppositely arranged outlet. It is a disadvantage of this device that the cells of the storage battery cannot be individually cooled or heated.

SUMMARY OF THE INVENTION

It is therefore, an object of the invention to provide, with a minimum of technical means, a high-temperature battery which ensures optimum cooling of all storage cells and maximum safety.

With the foregoing and other objects in view, there is provided in accordance with the invention a high-temperature battery comprising a thermal insulation housing for enclosing electrochemical storage cells, at least one housing air inlet for feeding cooling air into the interior of the housing, and at least one housing air outlet for the discharge of said air from the housing, at least one module containing electrochemical storage cells for insertion into the interior of said housing, said module arranged in said housing to cause cooling air introduced through said housing air inlet to flow into said module against the force of gravity, and said air leaving said module with the force of gravity discharging through said housing air outlet.

Other features which are considered as characteristic for the invention are set forth in the appended claims. Although the invention is illustrated and described herein as embodied in a high-temperature battery, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
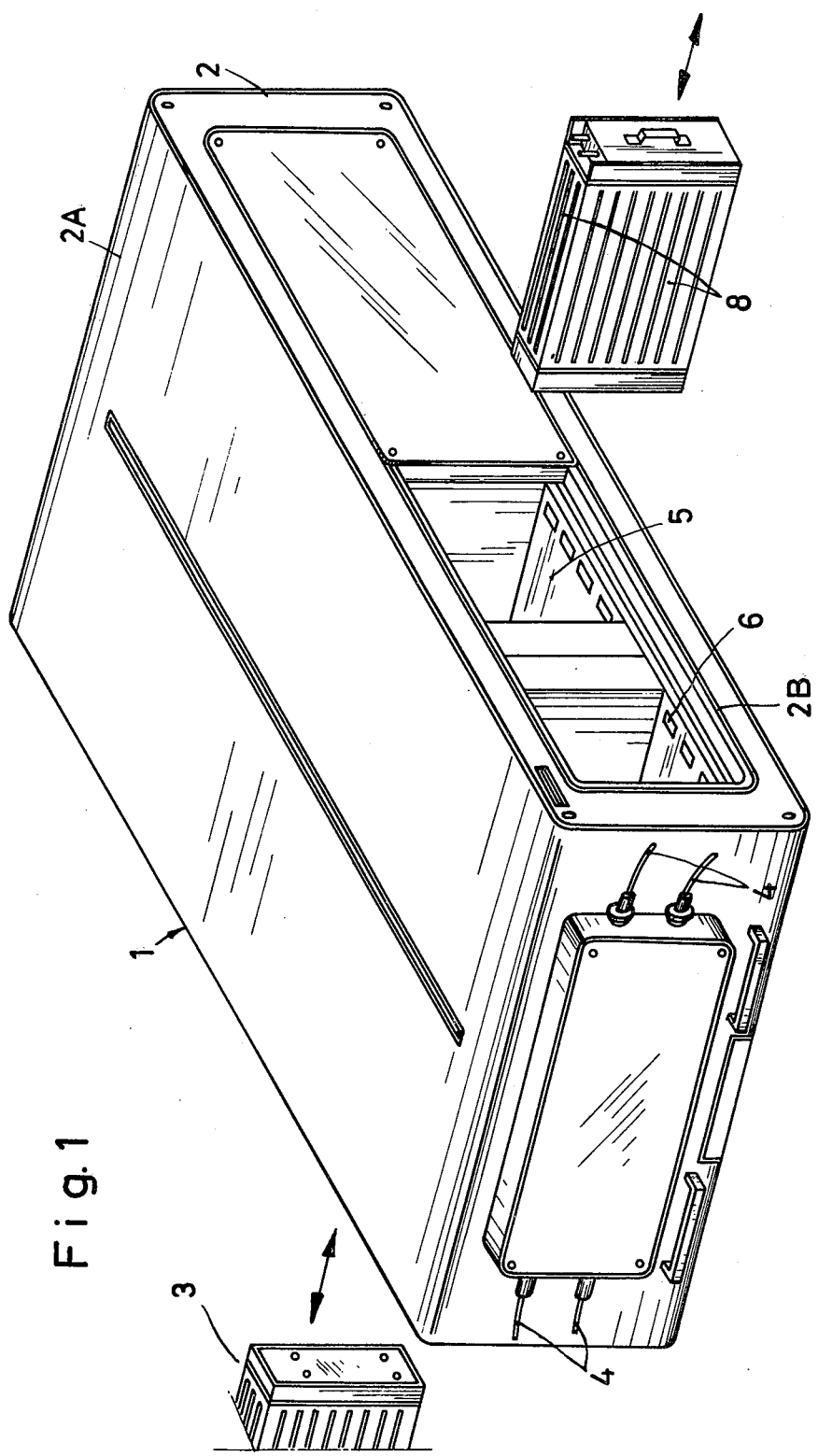
FIG. 1 diagrammatically illustrates a high-temperature battery in accordance with the invention having a housing of thermal insulation with modules containing storage cells enclosed in a safety enclosure, adapted to be individually inserted in or withdrawn from the interior of the housing. The housing has connections for introducing cooling air into the modules and for discharging air therefrom.

A high-temperature battery of the type mentioned at the outset is provided with at least one module which can be inserted into the high-temperature battery for receiving the storage cells. A feedline for cooling air and a discharge line for cooling air are arranged so that the cooling air can be fed into the module against the force of gravity and be discharged from the module with the force of gravity.

The high-temperature battery is designed so that each module has at least one connection for feeding-in the cooling air and a connection for discharging the cooling air. Each module used here can accommodate sixteen storage cells. Each module can be inserted as a separate unit into the high-temperature battery and separately removed from it. In one embodiment, the module is surrounded by a safety jacket. In another embodiment, this safety jacket is dispensed with. If this module is used, the space of the high-temperature battery receiving the module is subdivided into several chambers. Into each chamber, an open module is inserted. Each chamber has only one opening for inserting a module. The boundary walls of the chamber form the safety enclosure of the module. The chamber for each module is completely closed off toward the outside by a front panel. In each module, the feedline and discharge line for the cooling air extends parallel to the storage cells. The feedline is arranged preferably at the first and the discharge line of the cooling air at the second end of the module. The inlet opening of the feedline as well as the outlet opening of the discharge line are respectively arranged on the underside of the module. However, it is also possible to arrange these inlet and outlet openings at the first or second lateral lower end of the module. The inlet for the cooling air is in connection with the interior of the module only via a connecting opening, in which the storage cells are arranged. This connecting opening is arranged in the upper region of the module. The discharge of the cooling air is connected to the interior of the module likewise only via a connecting opening. This connecting opening is likewise arranged in the upper portion of the module. The cooling air conducted into the interior of the module is deflected downward at the storage cells. If required, the cooling air can also be conducted from the bottom to the top, however. The functions of feeding and discharging air can be interchanged in the embodiment examples described here. By the above-described measures, it is ensured in the high-temperature battery that the cooling air is introduced against the force of gravity into the module and is discharged from the module with the force of gravity. This is of advantage particularly if destruction of the storage cells within the module occurs. Such an accident usually results in the formation of sulfur dioxide. The latter has a higher specific gravity than air. Because of the above-described measures, air containing oxygen is blocked by the sulfur dioxide from penetrating further into the high-temperature battery, particularly into the module. Thereby, further burning off of the storage cells or the appearance of sulfur are prevented or at least retarded.

The invention will be explained in the following with particular reference to drawings.

The high-temperature battery 1 shown in FIG. 1 consists substantially of thermal insulation 2, 36 modules 3 as well as electrical terminals 4.

The high-temperature battery is confined by the thermal insulation 2. The latter consists of a double-walled housing 2A, the walls of which are made of sheet steel. The space 2B between the inner and outer walls is evacuated and filled with insulating material.

In the interior of the thermal insulation 2, two cavities 5 are provided on both sides of the symmetry axis of the high-temperature battery 1. Cavities 5 receive the modules 3. The cavities 5 can be made accessible by removing the lateral boundary surfaces of the thermal insulation 2. Each of the two cavities 5 can accept nine modules 3 in the embodiment example shown here. A connection for the cooling air supply and for the cooling air discharge is provided for each module. The first connection 6 is at the first end of each module 3, while the second connection (not shown here) is arranged in the vicinity of the second module end. Each of the modules 3 shown here contains sixteen electrochemical storage cells (not shown). Each module 3 can be inserted independently of the other modules 3 into the battery or be taken individually from the battery. In the high-temperature battery 1 shown in FIG. 1, each module 3 is surrounded by a safety enclosure 8 which shields it completely from the outside and against its two adjacent modules 3.

Figure 3:
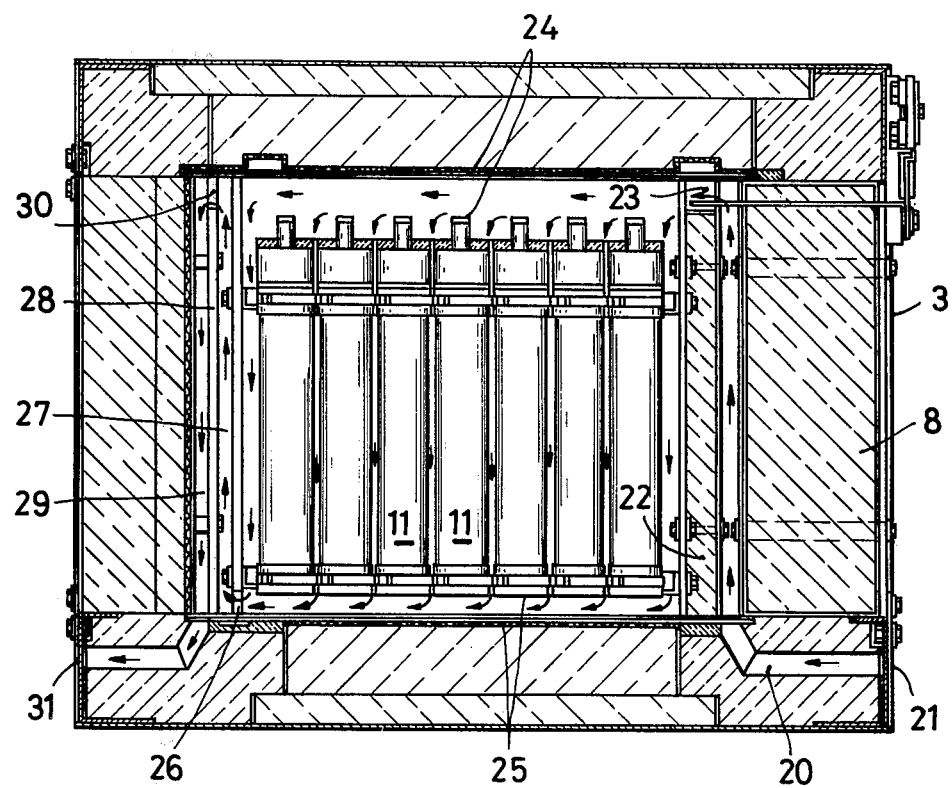
FIG. 3 is a vertical cross section of the module with the safety enclosure and shows the arrangement and spacing of the storage cell to permit cooling air entering and discharging through parallel lines to flow over the surfaces of the cells.

In FIG. 3, the design of a module 3 is shown and explained in detail in the corresponding description.

Figure 2:
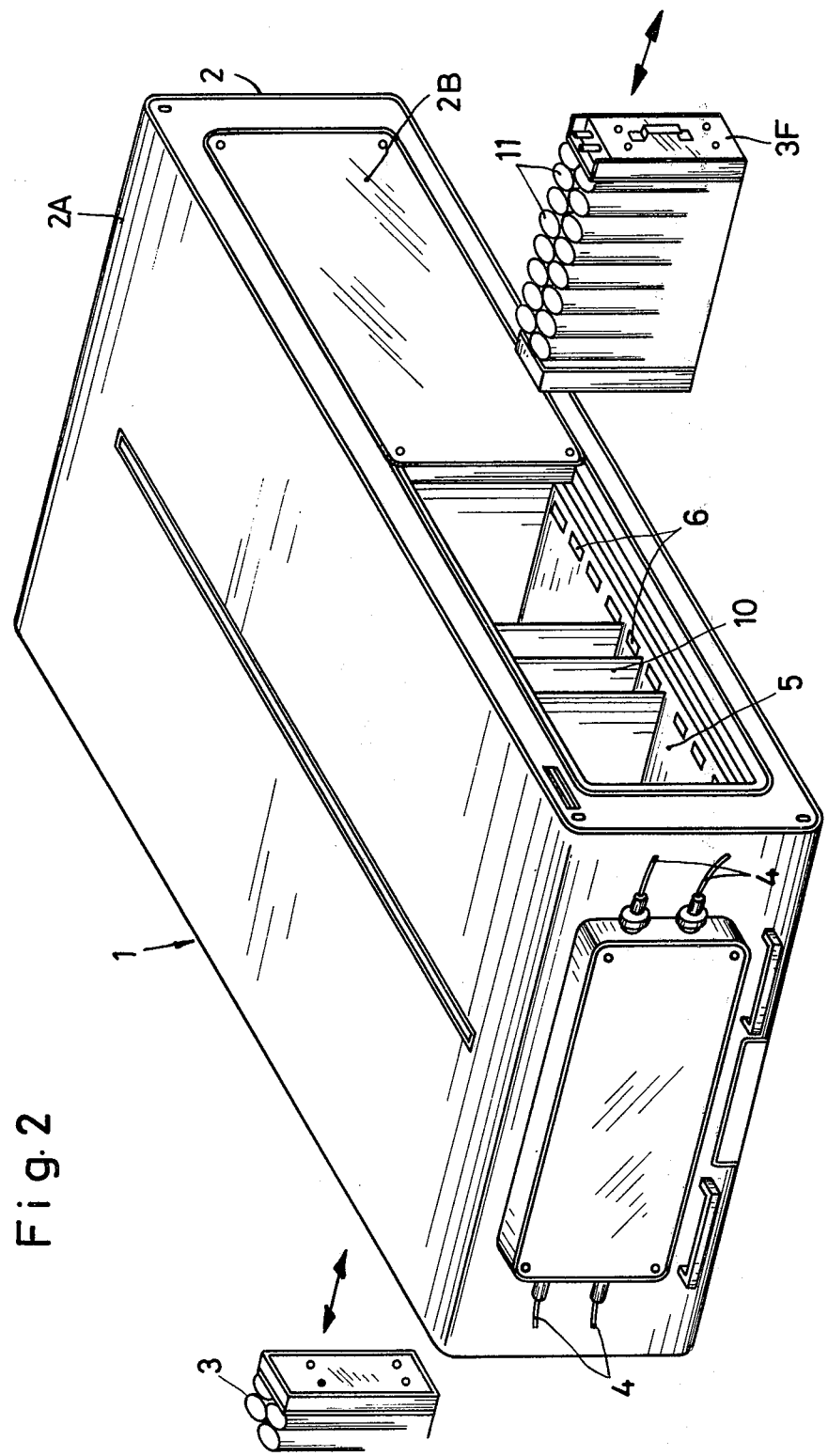
FIG. 2 is a variant of FIG. 1 but differs particularly in the modules not having a safety enclosure.

FIG. 2 shows a variant of the high-temperature battery shown in FIG. 1. It is substantially designed like the battery shown in FIG. 1 and explained in the corresponding description. The essential difference between this high-temperature battery and the one already described is that here, the modules 3 used have no safety enclosures 8. A chamber 10 is provided for each module 3 within the cavities 5. Chamber 10 has only one opening for inserting each module 3 and separates each module 3 from its adjacent module 3. Every module 3 has the front panel 3F which completely closes off the opening in the chamber 10. The boundary walls of the chambers 10 give the storage cells 11 of each module 3, like the modules 3 shown in FIG. 1, the required safety enclosure. Each chamber 10 is additionally provided with a connection 6 for feeding and another connection, not shown, for discharging the cooling air. Preferably, the first connection 6 is arranged in the vicinity of the first module end, and the discharge connection, not shown, in the vicinity of the second module end.

FIG. 3 shows a vertical cross section through a module 3. The cross section is taken parallel to the longitudinal axis of the module 3. The entire module 3 is surrounded by a safety enclosure 8. The latter is made of insulating material. The same applies for the walls of the chambers 10. In the interior of the module 3, storage cells 11 are arranged. They are fastened via a specially designed mounting so that an empty space 24, 25 remains between the safety enclosure 8 and the upper and lower ends of storage cells 11. Each module contains two rows of storage cells 11. The storage cells 11 are assembled together in pairs. They are inserted vertically into the module 3. Empty spaces are left between the individual storage cells 11, through which cooling air can flow in sufficient quantity. The module is provided with a feedline 20 for the cooling air. The inlet opening 21 of the feedline 20 is arranged at the lateral lower end. When using the module 3 which is inserted into the high-temperature battery 1 shown in FIG. 1, the opening 21 is preferably arranged at the underside of the module 3. The feedline 20 extends parallel to the storage cells 11. The storage cells 11 are separated from the feedline 20 by a partition 22. A connecting opening 23 is provided only in the upper region of the partition 22. Through this connecting opening 23, the cooling air which is introduced into the feedline 20 enters the interior of the module 3 in which the storage cells 11 are arranged. The cooling air which gets through the connecting opening 23 into the interior of the module 3, flows partly through the space 24 which is formed between the upper ends of the storage cells 11 and the safety enclosure 8. A certain amount of the admitted cooling air is deflected downward in front of each storage cell 11. It flows along the storage cell 11 down to the lower ends thereof. In this manner, the admitted cooling air flows around every storage cell. As already mentioned above, there is, between the lower ends of the storage cells and the safety enclosure 8, a further empty space 25. The latter receives the cooling air which flows downward along the storage cells 11. The cooling air which flows entirely through the space 24, is conducted downward along the last storage cell 11 and fed, together with the cooling air collected in the space 25, from the interior of the module 3 through a discharge opening 26 to the discharge 29. For this purpose, the cooling air contained in the lower region of the module 3 is conducted through a canal 27 which is defined by a vertical wall 28 arranged in the interior of the module and the discharge 29. Wall 28 extends into the upper region of the module 3. The cooling air can flow into the discharge 29 via a connecting opening 30. The discharge 29 is arranged so that it extends parallel to the storage cells 11. Thereby, the cooling air leaving the canal 28 can be introduced into the discharge 29 in such a manner that it emerges with the force of gravity from the module. The outlet opening 31 of the discharge 29 is installed in the described embodiment example at the lower lateral end of the module. Preferably, however, the opening is arranged in the bottom of the module, since in the high-temperature battery 1 shown in FIG. 1, the connection for the cooling air discharge is arranged in the bottom of the cavity 5.

If required, the cooling air can be introduced into the module 3 also in the reverse direction, i.e., the discharge 29 takes over the function of the feedline 20, while the feedline 20 takes over the function of the discharge 29. The cooling air now flows first into the space 25. Part thereof is deflected in front of every lower end of a storage cell 11 and is conducted along this storage cell 11 upward into the space 24.

We claim:

1. High-temperature battery comprising a thermal insulation housing for enclosing electrochemical storage cells, at least one housing air inlet for feeding cooling air into the interior of the housing, and at least one housing air outlet for the discharge of said air from the housing, at least one module containing electrochemical storage cells for insertion into the interior of said housing, said module having at least one feedline for the flow of cooling air in the housing into said module against the force of gravity and at least one discharge passage, through which the air leaves said module with the force of gravity, said feedline arranged at a first lateral end and the discharge passage arranged at a second other lateral end of the module, said feedline and said discharge passage have an inlet opening and an outlet opening respectively, in the lower region of the lateral ends of the module, said feedline and said discharge passage are in connection with the interior of the module containing the storage cells only via a respective connecting opening in the upper region of the module, said storage cells in the module arranged to provide empty spaces between them for the cooling air conducted in the interior of the module to flow through these spaces along the length of each storage cell, and empty spaces as passageways between the storage cells and the inner boundary surface of the module are provided for passage of cooling air in the module.

2. High-temperature battery according to claim 1, wherein each module can be inserted into a cavity in the interior of the thermal insulation housing.

3. High-temperature battery according to claim 1, wherein the thermal insulation housing has for each module at least one connection for the cooling air supply and one connection for the cooling air discharge.

4. High-temperature battery according to claim 2, wherein each cavity has for each module at least one connection for the cooling air supply and one connection for the cooling air discharge.

5. High-temperature battery according to claim 1, wherein in each module the storage cells are mounted and individually supported.

6. High-temperature battery according to claim 2, wherein each individual module can be separately inserted into the interior of the thermal insulation housing and can be separately removed from the interior of the thermal insulation housing.

7. High-temperature battery according to claim 1, wherein each module is surrounded by a safety enclosure.

8. High-temperature battery according to claim 2, wherein a chamber built into the cavity is provided for each module.

9. High-temperature battery according to claim 1, wherein said cooling air from said housing air inlet flows through the feedline to said storage cells in said module, and wherein said air from said cells flows through the discharge passage before discharging through said housing air outlet, and wherein the feedline and the discharge passage are parallel to the storage cells, so that the air flows into said module against the force of gravity, and said air leaving said module flows with the force of gravity.

* * * * *